United States Patent [19]
Muendel

[11] Patent Number: 5,533,163
[45] Date of Patent: Jul. 2, 1996

[54] OPTICAL FIBER STRUCTURE FOR EFFICIENT USE OF PUMP POWER

[75] Inventor: Martin H. Muendel, Cambridge, Mass.

[73] Assignee: Polaroid Corporation, Cambridge, Mass.

[21] Appl. No.: 283,226

[22] Filed: Jul. 29, 1994

[51] Int. Cl.⁶ ..................................... G02B 6/22
[52] U.S. Cl. ................. 385/126; 372/6; 385/146
[58] Field of Search ............... 372/6; 385/123–127, 385/133, 146

[56] References Cited

U.S. PATENT DOCUMENTS

| | | | |
|---|---|---|---|
| 3,808,549 | 4/1974 | Maurer | 372/6 |
| 4,763,975 | 8/1988 | Scifres et al. | 385/33 |
| 4,815,079 | 3/1989 | Snitzer et al. | 372/6 |
| 4,829,529 | 5/1989 | Kafka | 372/6 |
| 4,955,685 | 9/1990 | Garman | 385/123 X |
| 5,131,069 | 7/1992 | Hall et al. | 385/123 X |
| 5,187,760 | 2/1993 | Huber | 372/6 X |
| 5,245,690 | 9/1993 | Aida et al. | 385/123 X |
| 5,263,036 | 11/1993 | De Bernardi et al. | 372/6 |
| 5,268,978 | 12/1993 | Po et al. | 372/6 X |
| 5,291,501 | 3/1994 | Hanna | 372/6 |
| 5,313,544 | 5/1994 | Lentink | 385/123 |
| 5,319,652 | 7/1994 | Moeller et al. | 372/6 |

*Primary Examiner*—John D. Lee
*Attorney, Agent, or Firm*—Joseph Stecewycz

[57] ABSTRACT

An optical fiber structure for use in gain applications which comprises a core, selectively doped with an active gain species, and an inner cladding surrounding the core, where the inner cladding serves the purpose of receiving multimode pump energy from an external power source, confining this energy, and transferring the energy into the core by means of repeated interactions between the energy and the active dopant within the core as the pump energy propagates along the length of the fiber structure. The cross-sectional shape of the inner cladding is in the form of a non-rectangular, convex polygon so that the propagating pump energy is induced to form an essentially uniform radiation field in which the various radiation modes comprising the pump energy are isotropically distributed.

32 Claims, 10 Drawing Sheets

OPTICAL FIBER STRUCTURE FOR EFFICIENT USE OF PUMP POWER

CROSS REFERENCETO RELATED APPLICATIONS

This application is related to the concurrently filed U.S. patent application No. 283,225 of John R. Lewis entitled "Device for Optically Converting a Plurality of Beams" and application Ser. No. 283,381, now U.S. Pat. No. 5,418,880 entitled "High-Power Optical Fiber Amplifier or Laser Device", both commonly assigned herewith.

FIELD OF THE INVENTION

This invention relates to multiclad optical fiber structures having one or more gain cores, such as found in optical amplifiers or fiber lasers and, more particularly, to optical fibers used for the efficient coupling of pump radiation into the fiber gain core.

BACKGROUND OF THE INVENTION

Optical fiber amplifiers and lasers are now well-established as a technology having undergone remarkable progress in their development over the last several years. Early on they were of simple form comprising a gain species dispersed in a core surrounded by a cladding. The core, which serves as the host for the gain species, was usually of silica glass, but matrix material and hosts of fluoride or phosphate based glasses have been reported. The concentration of the gain species, the length of fiber, and the pump power are arranged so that losses are overcome by gains to provide amplification or laser action, where the fiber has been provided with suitable feedback. Output powers initially were on the order of milliwatts.

Initially, pumping was via the side of the core with flashtubes, but this was replaced by end pumping the core (i.e., "end-fired"). However, end pumping has its problems because it is not very efficient, even with laser diodes, so output power was limited to a rather low milliwatt level because all of the available pump power could not be fully utilized due to the practically realizable physical and optical properties of sources and fibers. With the advent of laser diode arrays operating at wavelengths suitable for pumping a number of rare-earth ions, it appeared that such sources were natural candidates for achieving higher output powers. But, because of their beam quality, coupled with inherent practical limits on optical fiber numerical apertures (i.e., solid acceptance cones), it was still physically impossible to efficiently couple these higher power sources into cores, especially single-mode cores which would require a single-mode pump for efficient coupling.

However, Snitzer et al. disclosed an elegant solution to this problem in U.S. Pat. No. 4,815,079, and provided a significant improvement over an earlier approach by Maurer as described in his U.S. Pat. No. 3,808,549. In the Snitzer et al. scheme, now referred to as "cladding pumping", a single-mode core containing the active ion is surrounded by an undoped inner multimode cladding of lower index than that of the core and is of a special geometry for efficient pumping. This, in turn, is surrounded by an outer cladding of yet lower index of refraction. Pump light is launched into the inner cladding and is confined by total internal reflection at the interface between claddings to propagate down the inner cladding, which is a core-like structure with respect to the outer cladding. The inner cladding, being multimode, is obviously physically larger than the core and therefore presents a better target, and the numerical aperture, being a function of the indices of the inner and outer claddings, is made as large as possible to more efficiently receive pump power. As pump power propagates down the inner cladding, it is progressively absorbed by the core to provide the population inversion necessary for gain and subsequent laser action with suitable feedback. This scheme is a hybrid having the character of both longitudinal and transverse pumping, and has the great merit of efficiently coupling available pump power from an incoherent source to a single-mode core to provide single-mode output. Inner cladding geometries that have been found efficacious include elongated slab configurations, like the rectangle, and a configuration in which a core is eccentrically located inside of the inner cladding.

Even though the Snitzer et al. configurations represent significant methods for enhanced coupling for pump power provide a single mode output in fiber format, it is a primary object of the present invention to provide a variety of cladding shapes for use in efficient cladding pumping of fiber amplifiers and lasers.

It is a further object of the present invention to provide a variety of efficient cladding shapes for use with a variety of pump radiation distribution patterns.

It is another object of the present invention to provide efficient cladding shapes to match available pump characteristics.

It is another object of the present invention to provide an optical fiber with optimal radiation coupling efficiency.

It is another object of the invention to provide such an optical fiber in which the fiber core is single-mode.

It is another object of the invention to provide such an optical fiber which will provide an even distribution of radiation modes within the fiber inner cladding.

It is yet another object of the invention to provide an optical fiber in which the fiber radiation coupling efficiency is not a function of the location of the fiber core.

Other objects of the invention will, in part, be obvious and will, in part, appear hereinafter when the following detailed description is read in connection with the drawings.

SUMMARY OF THE INVENTION

An optical fiber structure for use in gain applications includes at least one core, selectively doped with an active gain species, and an inner cladding surrounding the core. The inner cladding serves the purpose of receiving multimode pump energy from an external power source, confining this energy, and transferring the energy into the core by means of repeated interactions between the energy and the active dopant within the core as the pump energy propagates along the length of the fiber structure. The cross-section of the inner cladding is in the form of one of several disclosed convex polygon shapes. The properties of the cladding cross-sectional shape induce the propagating pump energy to form an essentially uniform radiation field in which the various radiation modes comprising the pump energy are isotropically distributed. Each polygon shape has the properties that (i) if a number of identical polygons were used to cover a planar region by tiling, all of the polygons would fit into the tiling arrangement with no spaces present between adjacent polygons and (ii) all the polygons would be mirror images of one another about any common side. Among the several cladding cross-sectional shapes disclosed are convex polygons of three, four, and six sides.

BRIEF DESCRIPTION OF THE DRAWINGS

The novel features that are considered characteristic of the present invention are set forth with particularity herein. The organization and method of operation of the invention, together with other object and advantages thereof, will be best understood from the following description of the illustrated embodiments when read in conjunction with the accompanying drawings wherein.

INTRODUCTION

Optical fiber amplifiers and lasers commonly function with optical radiation propagating within the core of a component optical fiber. During operation of the amplifier or laser, signal or pump radiation is injected at one end of the optical fiber, is confined and guided by the fiber, and emerges from the other fiber end as an amplified signal or as lasing radiation.

Figure 1:
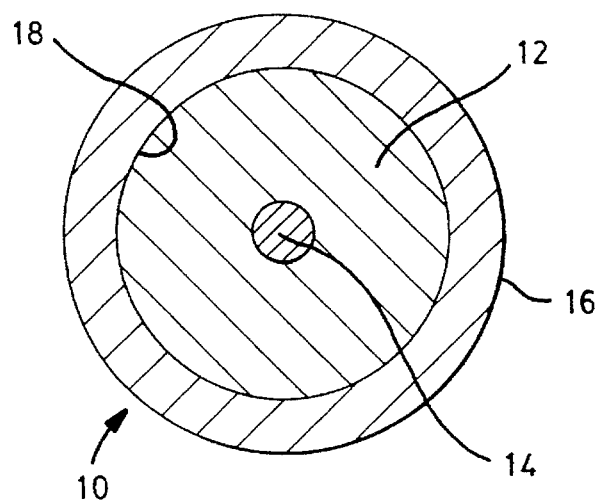
FIG. 1 is a diagrammatic cross-sectional view of a prior art optical fiber having a core doped with a gain species, surrounded by an inner cladding, which in turn is surrounded by an outer cladding.

FIG. 1 is a cross-sectional view of a circularly-symmetric multiclad optical fiber 10 comprising a core 14, an inner cladding 12 surrounding the core 14 and an outer cladding 16 surrounding the inner cladding 12. Core 14 can range from 2 to about 10 µm in diameter for single-mode generation. In low-power applications, the pump radiation is typically single-mode and can be injected directly into core 14. When the index of refraction $n_1$ of core 14 is larger than the index of refraction $n_2$ of the inner cladding 12, the radiation can be largely confined within core 14 by means of total internal reflections. As is well known in the art, total internal reflections will occur when radiation strikes the core boundary at an angle smaller than a critical angle $\theta_c$. Angle $\theta_c$, which is measured from the normal to the core boundary, is found from the relationship $\sin \theta_c = \sin^{-1}(n_2/n_1)$.

However, because most available single-mode radiation sources are low in power, such sources will not suffice for an application requiring high power levels, even with efficient coupling. For these applications, an input source of higher power is required, but such sources are typically multimode and cannot be injected directly into an optical fiber core without incurring loss of brightness. One early solution to this problem was to indirectly inject the multimode radiation into the inner cladding, where the inner cladding functioned as a waveguide region to contain and guide such injected radiation.

For an optical fiber, such as fiber 10, inner cladding 12 functions as a waveguide by means of internal reflections of the radiation occurring at an interface 18 lying between inner cladding 12, with index of refraction $n_2$, and outer cladding 16, with a smaller index of refraction $n_3$. The purpose of inner cladding 12 is to confine the injected radiation so that the radiation repeatedly intersects the core 14 as it propagates along the length of fiber 10. With each such intersection with core 14, a portion of the pump radiation is absorbed by an active gain dopant contained within core 14. The length of an optical fiber is typically tens of meters so as to produce a large number of these interactions and allow the core to absorb as much pump radiation as possible.

Optical amplifiers may make use of fiber configurations, such as that shown in FIG. 1, to couple amplifying radiation into a signal propagating in the fiber core. U.S. Pat. No. 3,808,549 issued to Maurer discloses an optical communication device comprising a radiation source aligned with an optical fiber. The communication device includes an optical fiber 20 and an optical waveguide 32, both shown in longitudinal cross section in FIG. 1 of that patent, here shown as FIG. 2. Optical fiber 20 comprises an inner transparent cladding layer 22 disposed on the surface of a core 24, and a thin outer cladding layer 26 disposed on the surface of the inner cladding layer 22. An output end 25 of optical fiber 20 is aligned with an input end 35 of the optical waveguide 32. Radiation generated in core 24 is coupled to the optical waveguide 32.

The reference patent states that the refractive index of the outer cladding layer 26 must be sufficiently lower than that of the inner cladding layer 22 so that an appreciable amount of radiation from a source 34 is accepted by and propagated along the core 24. The core 24 absorbs the radiation as it is reflected back and forth many times from the interface 28. The reference further states that the length of the optical fiber 20 should be made sufficiently great to permit most of the radiation to be absorbed by the core 24.

Figure 2:
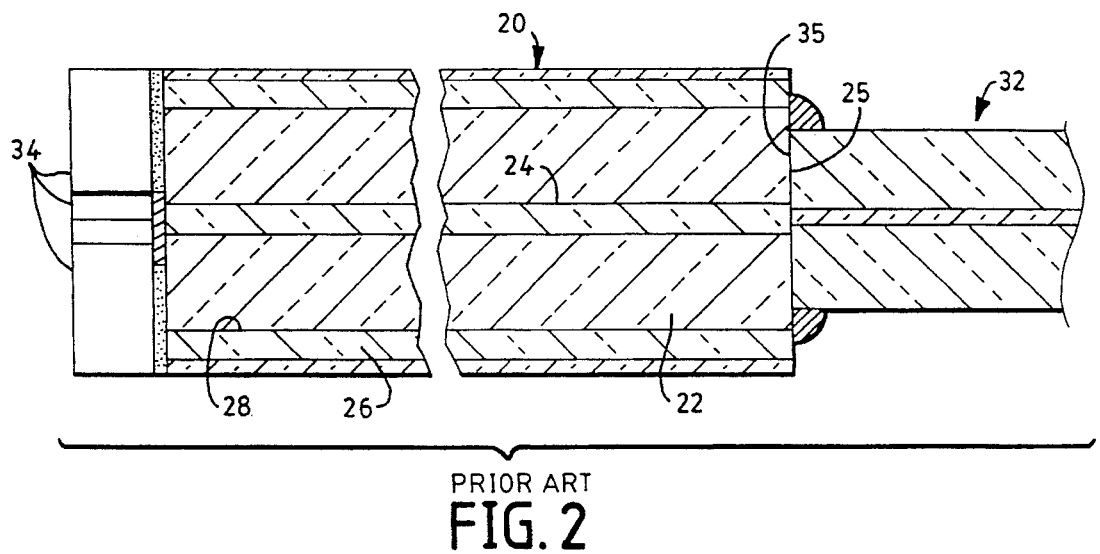
FIG. 2 is a diagrammatic longitudinal cross-sectional view of a prior art optical fiber aligned with an optical waveguide and coupled to a source of radiation.
Figure 3:
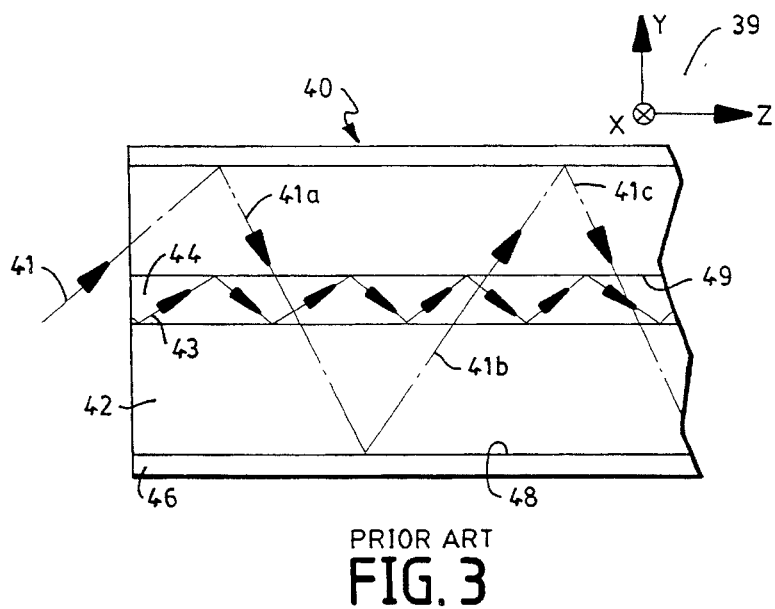
FIG. 3 is a longitudinal cross-sectional view of a prior art fiber laser and includes lasing rays propagating within the fiber laser core.

U.S. Pat. No. 4,829,529 issued to Kafka discloses a multiclad optical fiber used as a lasing cavity for a fiber laser. FIG. 2 of the reference patent provides a cross-sectional side view of a single-mode fiber with associated multimode fiber pumping cavity. This illustration is presented here as FIG. 3. An xyz-coordinate system 39 is included to aid in discussion.

A fiber laser 40 is comprised of a single-mode core 44 surrounded by a multimode cladding 42 and an outer layer 46, the latter two of which define a pump cavity. The indices of refraction for cladding 42 and outer layer 46 are chosen so that pump radiation will be totally internally reflected at an interface 48. As the radiation propagates along the cladding 42, it may intersect the core 44 many times and couple to a laser gain medium within the core 44, provided it is in a mode which behaves in this manner. However, not every mode that is excited in such a structure will propagate along a path that intersects the core. In fact, skew rays, which carry the bulk of the pump energy, are concentrated in an annular region surrounding the core and therefore never intersect it. Because the core is located in the center, away from the location of most of the pump energy, such circularly symmetric fiber structures are relatively inefficient users of available pump power and therefore of little practical interest. The nonuniform modal distribution in circularly symmetric fibers is a consequence of the geometry, and the circular geometry and central core placement are simply unsuitable for efficient use of pump power.

Now, one may recognize that an increase in the area of the core with respect to the area of the cladding may improve coupling efficiency. However, the core and cladding dimensions are normally fixed by the physical requirements of the laser and amplifier systems. The core diameter, which must be small enough to limit radiation propagation in core 14 to single-mode operation, is typically 10 μm or less. The cladding diameter, which must be large enough to efficiently acquire radiation from a multimode source, is typically 125 to 1100 μm. What is needed is an optical fiber configuration in which the coupling efficiency can be improved without increasing the size of the fiber core.

One method of improving fiber coupling efficiency without changing the fiber core diameter is disclosed in U.S. Pat. No. 5,291,501 issued to Hanna, which describes the use of "cladding pumping" to input multimode radiation into an optical fiber core. In the reference patent, an inner cladding is doped with a first active material and a single-mode core is doped with a second, different laser active material such that, when the inner cladding is pumped, the resulting lasing emission serves as pump radiation for the laser active dopant in the optical fiber core. The reference states that the radiation is more readily absorbed into the active material of the inner cladding rather than into the core by leakage. The pump radiation is thereby absorbed in a much shorter length than the absorption length for other cladding pumping arrangements which utilize a transparent inner cladding. However, this approach requires that the inner cladding incorporate an active dopant.

Conventional optical fiber amplifiers and fiber systems, such as those described above, incorporate optical fibers having a circular cross section. These systems have sought to improve the optical fiber coupling efficiency without fully appreciating the limitation imposed upon the coupling process when the inner cladding layer is in the form of a rotationally symmetric waveguide. When a circular waveguide is used to contain and couple radiation into a central core, the resulting distribution of radiation within the waveguide is not isotropic and, therefore, not every radiation mode intersects the core. Consequently, not all the radiation present in the optical fiber is available for absorption by the fiber core.

Figure 4A:
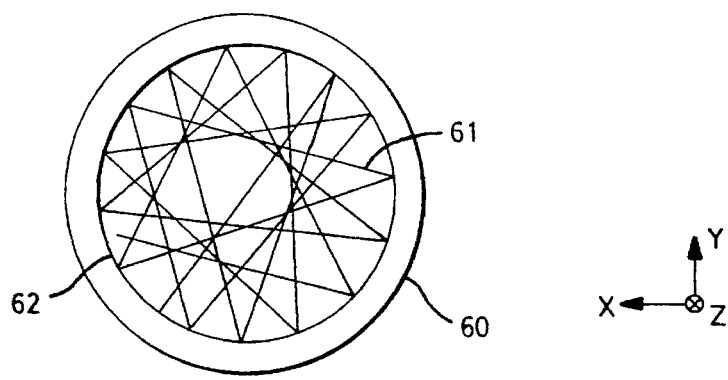
FIG. 4A is a simplified diagrammatic cross-sectional view of an optical fiber with line segments denoting rays of different modes within the waveguide.

This limitation can best be illustrated with reference to FIGS. 4A through 4C. Optical fiber 60 is a simplified representation of the cross section of a multiclad optical fiber. Propagating radiation is represented by a plurality of rays 61 confined within an inner cladding 62. Because it is impossible to graphically represent the hundreds or even thousands of radiation modes present in a multimode optical fiber structure as illustrated, only a few rays of radiation are shown in FIG. 4A.

It is well known in the art that the bounce angle, as seen in the x-y plane, for one radiation mode will generally not be the same as the bounce angle for another radiation mode. A higher-order mode ray 61a propagates along optical fiber 60 with a smaller bounce angle (e.g., 10°) as shown in FIG. 4B, while a lower-order mode ray 61b propagates at a larger bounce angle (e.g., 40°) as shown in FIG. 4C. Additionally, because the cross section of inner cladding 62 is circular, the bounce angle for a particular radiation mode will not change as the radiation propagates along the fiber.

Figure 4B:
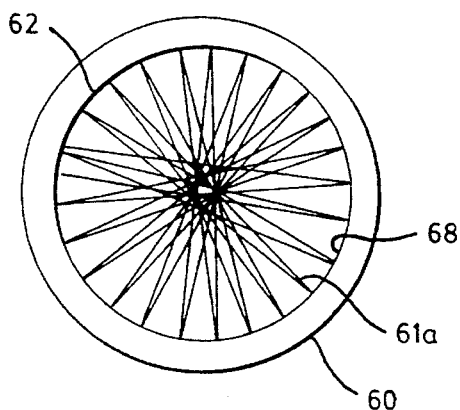
FIG. 4B is a diagrammatic cross-sectional view of the optical fiber of FIG. 4A showing a lower-order mode ray having a bounce angle of approximately 10°.

It can be seen from FIG. 4B that higher-order mode ray 61a, with the smaller bounce angle (i.e., the angle between incident and reflected rays), passes through the core region of fiber 60 and may intercept a centrally-located core. In comparison, lower-order mode ray 61b, with the larger bounce angle, does not intercept a core 64 positioned at the center of optical fiber 60. Further, because the bounce angle for ray 61b does not change, any reflected ray consequent to ray 61b does not pass through core 64, regardless of the length of fiber 60. In other words, the various radiation modes propagating within a circular waveguide are not isotropically distributed.

Figure 5:
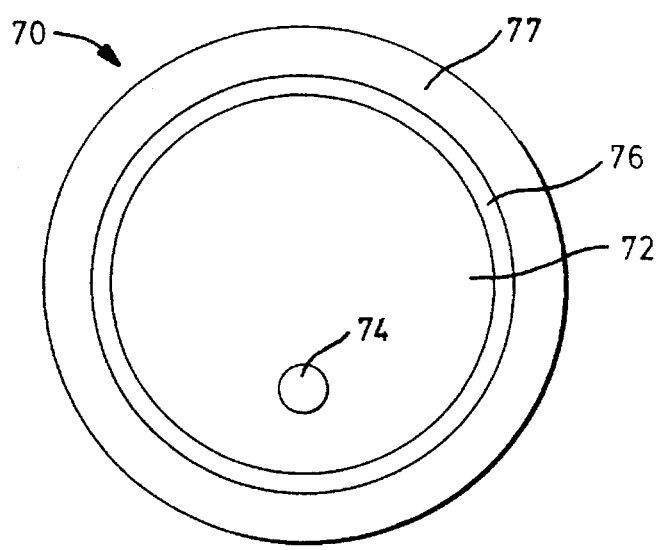
FIG. 5 is a diagrammatic cross-sectional view of a prior art laser having a doped, active core eccentrically located inside of a surrounding inner cladding.

Recognizing that the cross-sectional geometry of a fiber determines its modal distribution, Snitzer et al. made significant improvements over the previously advocated purely circular double clad fiber structures. These geometries are disclosed in U.S. Pat. No. 4,815,079 issued to Snitzer et. al. FIG. 5, corresponding to FIG. 1 of the referenced patent, shows a cross section of an optical fiber laser 70 comprised of a single-mode core 74 surrounded by an inner cladding layer 72. Inner cladding layer 72 is in turn surrounded by an outer cladding layer 76 which has a lower index of refraction $n_3$ than the index of refraction $n_2$ for inner cladding layer 72. A protective layer 77 may also be provided. In the laser configuration shown, core 74 is eccentrically located inside of inner cladding layer 72.

According to the reference patent, the amount of displacement required is determined by the condition that a substantial amount of radiation propagating in the inner cladding layer 72 couples into the core 74. This coupling occurs whenever the radiation propagating in the inner cladding layer 72 intersects the core 74 at the displaced position and is absorbed by the core 74. The device described in the patent has achieved an improved coupling efficiency of approximately 27 %.

The change in coupling efficiency caused by a displacement of core 74 from the center of fiber 70 results from the fact that the radiation present within a circular waveguide, such as inner cladding 72, is not isotropically distributed throughout the cross section of optical fiber 70, but rather resides in an annular region surrounding the core. The second embodiment disclosed by Snitzer et al. had an inner cladding in the form of an elongated slab, preferably rectangular in shape, which was thought to cause the bulk of the modes to pass through the narrowest part of the structure where the core was placed. This structure was remarkably successful compared with the prior art, exhibiting an efficiency in excess of 70 percent.

Based on the foregoing reasoning, it would seem that an optical fiber configuration, which produces a nonuniform field and "concentrates" the various radiation modes within a certain cross-sectional region of the inner cladding, would be the general approach to solving the coupling problem. It would follow that by positioning the core within this region of mode concentration, an increased number of modes will intercept the core and the coupling efficiency will likewise be increased. However, not all modes are accessed by a core lying within a waveguide which is not modally isotropic. To achieve optimal coupling efficiency, all modes of the radiation contained within an optical fiber must pass through the core of the fiber. Otherwise, the power corresponding to those modes not passing through the core will not be available for absorption by the active dopant in the core and coupling efficiency is reduced.

Figure 4C:
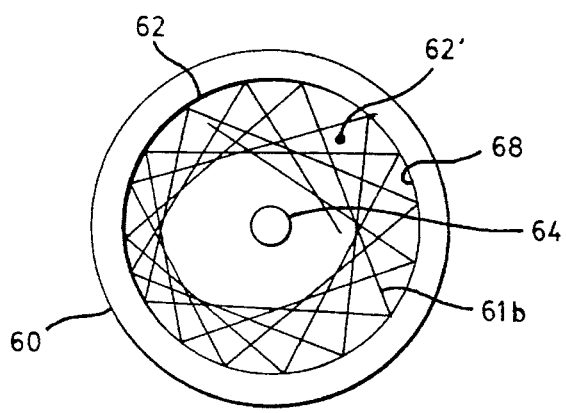
FIG. 4C is a diagrammatic cross-sectional view of the optical fiber of FIG. 4A showing a higher-order mode ray having a bounce angle of approximately 40°.

This can be illustrated by again referencing FIGS. 4B and 4C. It can be seen that as the bounce angle increases, the corresponding radiation is concentrated in an ever-smaller annular region 62' of inner cladding 62. To intercept the radiation modes having bounce angles approaching 180°, it would be necessary to position core 64 within a small distance of interface 68. The radiation having greater bounce angles is preferentially absorbed, because of the greater frequency of passes made through core 64. The radiation having the smaller bounce angles spends a greater proportion of its propagation passing through the center of inner cladding 62 and, consequently, has a proportionately smaller probability of absorption in the offset core 64. Moreover, the ability of core 64 to confine radiation decreases because of radiation field effects. Consequently, a minimum distance of separation must be maintained between core 64 and interface 68. Thus, physical limitations will not allow placement of a core in a circular waveguide such that all radiation modes are intercepted by the core.

DETAILED DESCRIPTION OF THE INVENTION

The present invention utilizes double-clad optical fiber configurations which produce a uniform distribution of radiation modes within the inner cladding. Such configurations expose the core to all radiation modes. Further, the core can be positioned essentially anywhere within the inner cladding without affecting the coupling efficiency of the fiber. It has been found that a uniform radiation field is produced when the waveguide region, or inner cladding, of an optical fiber has a geometric shape which meets certain criteria to be discussed.

It is well-known in the art that the cross-sectional area $A_{multimode}$ of an inner cladding is fixed by the power (P) of the pump radiation, the numerical aperture (NA) of the waveguide, and the "brightness" (B) of the pump source (i.e., source intensity per solid angle). An expression for the cross-sectional area of the inner cladding is given by $$A_{multimode} = P/[B(NA)^2]$$

Clearly, given that the input pump source is isotropic and uniform in angular distribution (and therefore in the two-dimensional cross-sectional projection), the Brightness Theorem holds that, at best, one can only maintain the same radiation intensity across the entire cross section of the inner cladding, and that the radiation intensity cannot be increased locally at the expense of lowering it elsewhere. It follows that the highest achievable coupling efficiency from inner cladding into core is given by the ratio of core cross-sectional area to inner cladding cross-sectional area (i.e., $A_{core}/A_{multimode}$). This disclosure provides an analysis which shows that this optimal efficiency can be achieved when the cross-section of the fiber waveguide, or inner cladding, is in the shape of one of the several polygons disclosed in this specification.

Figure 6:
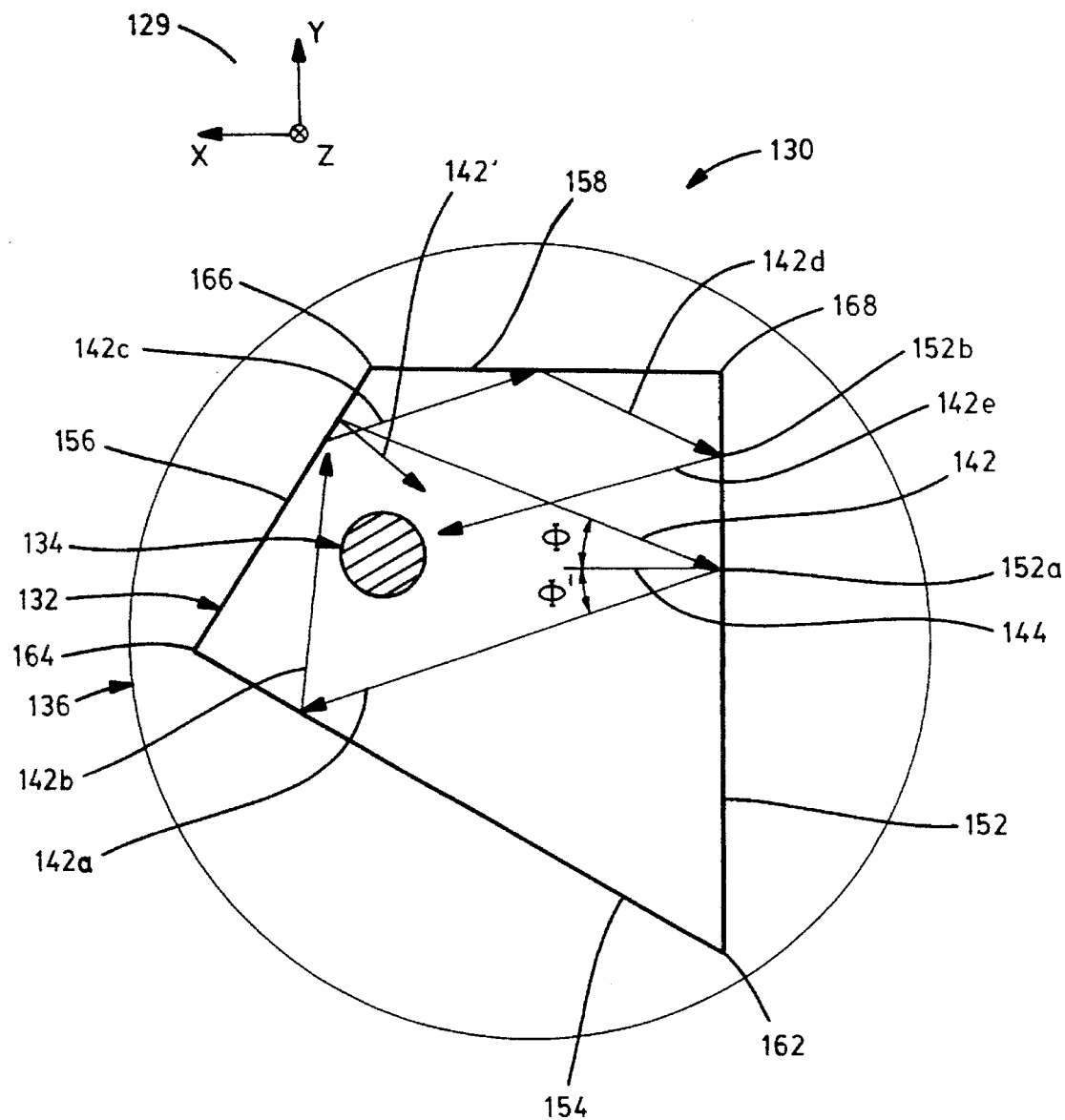
FIG. 6 is a diagrammatic cross-sectional view of an optical fiber, having a waveguide according to the invention, illustrating the projections, in the cross-sectional plane, of a series of ray segments representing a ray propagating along the length of the fiber.

FIG. 6 illustrates the cross-sectional structure and geometry of an optical fiber 130 according to the present invention. The longitudinal dimension of optical fiber 130 extends generally along the z-axis of an xyz-coordinate system 129. Optical fiber 130 is comprised of a core 134 surrounded by an inner cladding 132. Core 134 comprises a suitable optical host, such as fused silica, which is doped in a well-known manner with a gain material. In the preferred embodiment, a silica doped with a rare earth element ion such as neodymium ($Nd^{3+}$) or yttrium, present in concentrations of up to 0.5 weight-percent or lower, is used as the core dopant. Core 134 is generally circular in cross section, although other shapes, such as that of an ellipse, can be used as well.

Inner cladding 132 comprises material having an index of refraction, $n_2$, which is smaller than the index of refraction, $n_1$, of the core material. The cross-sectional shape of inner cladding 132 is that of a convex polygon. Optical fiber 130 also includes an outer cladding 136 comprising a material having an index of refraction, $n_3$, smaller than inner cladding index of refraction, $n_2$. Optical radiation is confined to inner cladding 132 by means of total internal reflection at the interface between it and cladding 136. Inner cladding 132 functions as a core with respect to outer cladding 136 to couple the radiation into core 134. Outer cladding 136 is preferably circular in cross section and is preferably made of a low-index fluorinated polymer.

Although the polygon is here depicted as a bilaterally symmetric quadrangle, this is done only for the purpose of the analysis which follows, and it should not be construed that inner cladding 132 is limited to having this particular cross-sectional shape. In accordance with the present invention, several alternative cross-sectional shapes are disclosed below. An optical fiber waveguide having any of the disclosed cross-sectional shapes will induce incoming multimode optical radiation to form into an essentially uniform radiation field within the optical fiber. By a uniform radiation field is meant that the radiation field will have an essentially constant intensity throughout the cross-section of the optical fiber waveguide. Radiation propagating through optical fiber 130 forms into a uniform radiation field because of the geometric properties of the cross-sectional shape of inner cladding 132.

Because the radiation field produced is uniform, and all optical rays propagating within optical fiber 130 spend essentially the same fraction of time (approximately $A_{core}/A_{multimode}$) propagating within core 134, the optical rays will undergo the same amount of absorption in core 134 as they continue to propagate, regardless of the placement of core 134 within cladding 132. Consequently, the optimal coupling efficiency of optical fiber realized. In comparison, optimal coupling efficiency cannot be realized for a circular waveguide because not all propagating radiation intersects a core if a circular waveguide is used. Optimal coupling efficiency can be attained only if a uniform radiation field is present within the optical fiber waveguide.

The invention will be explained by means of a pictorial depiction of the optical radiation propagating in optical fiber 130. For the purposes of this disclosure, the description is simplified with the assumption that inner cladding 132 supports a large number of modes (i.e., more than 1000 modes). Propagation of the radiation field can then be represented by an incoherent superposition of classical optical rays. A uniform radiation field would then be depicted as a uniform distribution of optical rays lying in an x-y projection plane consisting of the planar cross section of optical fiber 130.

By way of example, a first optical ray 142 and a second optical ray 142' propagate along fiber 130 in the z-direction, shown in FIG. 6, undergoing a series of reflections from the interface at cladding 132. Each reflected ray is represented by a two-dimensional projection of its optical path onto the cross-sectionsl x-y plane. Because optical rays enter inner cladding 132 at different locations and at different angles of incidence to execute different modes, first optical ray 142 and second optical ray 142' will not generally have the same angles of reflection along interface 138.

The cumulative x-y projections of either ray 142, or any other ray 142', will tend to uniformly cover the projection plane because the fields formed by the rays are uniformly distributed across the cross section of inner cladding 132. From a physical standpoint, this means that optical ray 142 must intersect core 134 as it propagates along optical fiber 130. Ray 142' will likewise intersect core 134, although not necessarily at the same places of intersection as for ray 142.

If all the subsequent reflections of any propagating ray were to be depicted in the illustration, inner cladding 132 would become entirely crisscrossed with lines representing the reflecting rays produced. It would be impossible to show all subsequent reflections clearly and it could not readily be determined whether a particular inner cladding shape produces a uniform radiation field. To depict subsequent reflections in a manner which allows such a determination to be made, a different method of illustration is used.

As is well known to those skilled in the art, the multiply-folded path followed by an optical ray making successive reflections at the interior surface interfaces of a waveguide can also be depicted as a straight-line path extending across the interfaces of a succession of adjoining "virtual" waveguides. Each successive virtual waveguide is constructed by performing a mirror reflection of the previous waveguide across an interface common to both waveguides.

Figure 7:
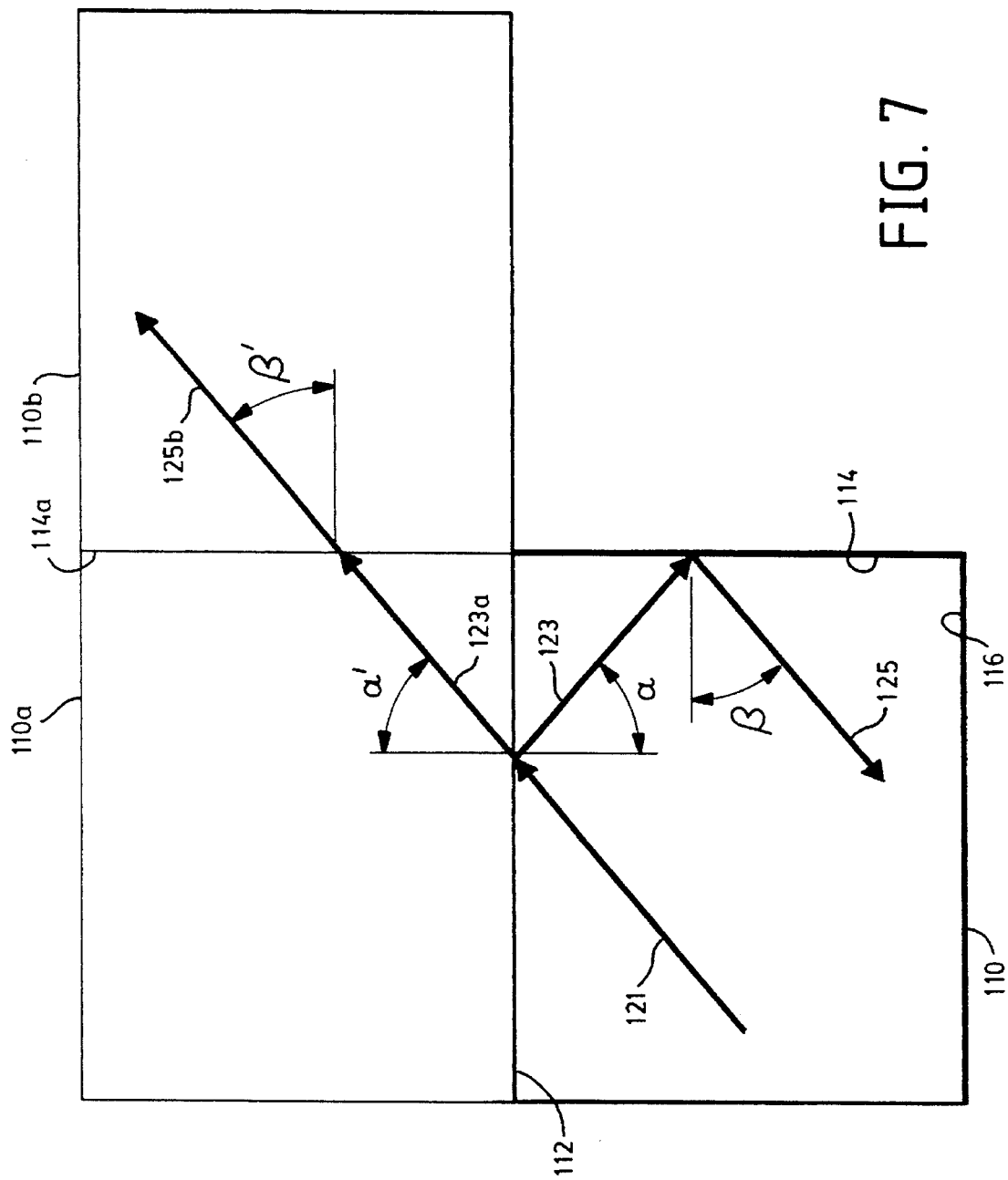
FIG. 7 is a diagram illustrating two graphical representations of an optical ray undergoing internal reflections in a waveguide as it propagates along a fiber.

FIG. 7 shows a waveguide core 110 comprised of a right surface 114, a top surface 112 and a bottom surface 116. An optical ray 121 (i.e., the x-y projection of the optical ray) propagates along waveguide core 110 by following a folded path consisting of a series of internal reflections. A first reflected ray segment 123 is produced by a reflection from top surface 112. The angle of reflection $\alpha$ is equal to the angle of incidence. A second reflected ray segment 125 is produced by a reflection from right surface 114 and reflects at an angle $\beta$.

Propagating optical ray 121 and reflected ray segments 123 and 125 can also be represented by means of a straight line consisting of three parts: ray 121, a first virtual reflected ray segment 123a, and a second virtual reflected ray segment 125b. Ray segment 123a appears in a first virtual waveguide 110a and corresponds to first reflected ray segment 123. Virtual waveguide 110a is constructed by a mirror reflection of waveguide core 110 across the common interface consisting of top surface 112. Ray segment 123a is also a mirror reflection of ray segment 123 across the common interface. The angle of reflection $\alpha'$ for ray segment 123a is the same as the angle of reflection $\alpha$ for ray segment 123.

Ray segment 123a is incident on right virtual surface 114a and produces second virtual reflected ray 125b which appears in a second virtual waveguide 110b. Virtual waveguide 110b is constructed by a mirror reflection of virtual waveguide 110a across the common interface consisting of right surface 114a. Ray 125b corresponds to ray 125 in waveguide core 110, and the angle of reflection $\beta'$ is equal to the angle of reflection $\beta$ for ray 125. This process of construction is continued for the subsequent reflections occurring in the waveguide core 110. Both the method of representing the propagation of optical radiation as a folded line, and the alternate method of representing the propagation as a straight line are used in the disclosure below.

Propagating ray 142 is represented as a folded line in FIG. 6. Reflections occur at the inside surfaces of inner cladding 132, these interfaces being represented by sides 152, 154, 156, and 158. Sides 152 and 154 form a vertex 162, sides 154 and 156 form a vertex 164, sides 156 and 158 form a vertex 166, and sides 158 and 152 form a vertex 168.

Within inner cladding 132, the optical path taken by ray 142 is represented as a series of reflected ray segments, denoted by lines and arrowheads. Ray 142, for example, is incident upon polygon side 152 at an angle $\phi$ relative to a surface normal 144. A first reflected ray segment 142a leaves side 152 at an angle $\phi'$ to the surface normal 144, where $\phi'$ equals $\phi$. First reflected ray segment 142a, in turn, reflects off side 154 to produce a second reflected ray segment 142b. Third reflected ray segment 142c, fourth reflected ray segment 142d, and fifth reflected ray segment 142e are produced in a similar manner by reflections off sides 156, 158, and 152 respectively.

It can be seen that, because fourth reflected ray segment 142d is incident upon side 152 at a location 152b different from the point of incidence 152a of ray 142, fifth reflected ray segment 142e originates from a different point on side 152 than does first reflected ray segment 142a. Consequently, even though first reflected ray segment 142a does not intersect core 134, a subsequent reflected ray segment, fifth reflected ray segment 142e in this case, does intersect core 134 because successive reflected ray segments cross the two-dimensional cross-sectional plane at different locations. This property assures that core 134 will eventually be intersected by every optical ray propagating within optical fiber 130, and, as stated earlier, is a consequence of the preferred geometry used for the cross-sectional shape of inner cladding 132.

Moreover, as the reflections continue, essentially any region within the projection plane will be crossed by one of the sequence of reflected rays produced by ray 142. This occurs because successive reflections do not repeat the same path followed in the projection plane by a previous reflection. The successive reflections thus tend to "migrate" across the projection plane. This description is equally valid for the propagation of second ray 142', or for any another optical ray injected into optical fiber 130. All such rays will have essentially the same probability of passing through a particular region in the projection plane and all rays will intersect the core many times over its length.

Figure 8:
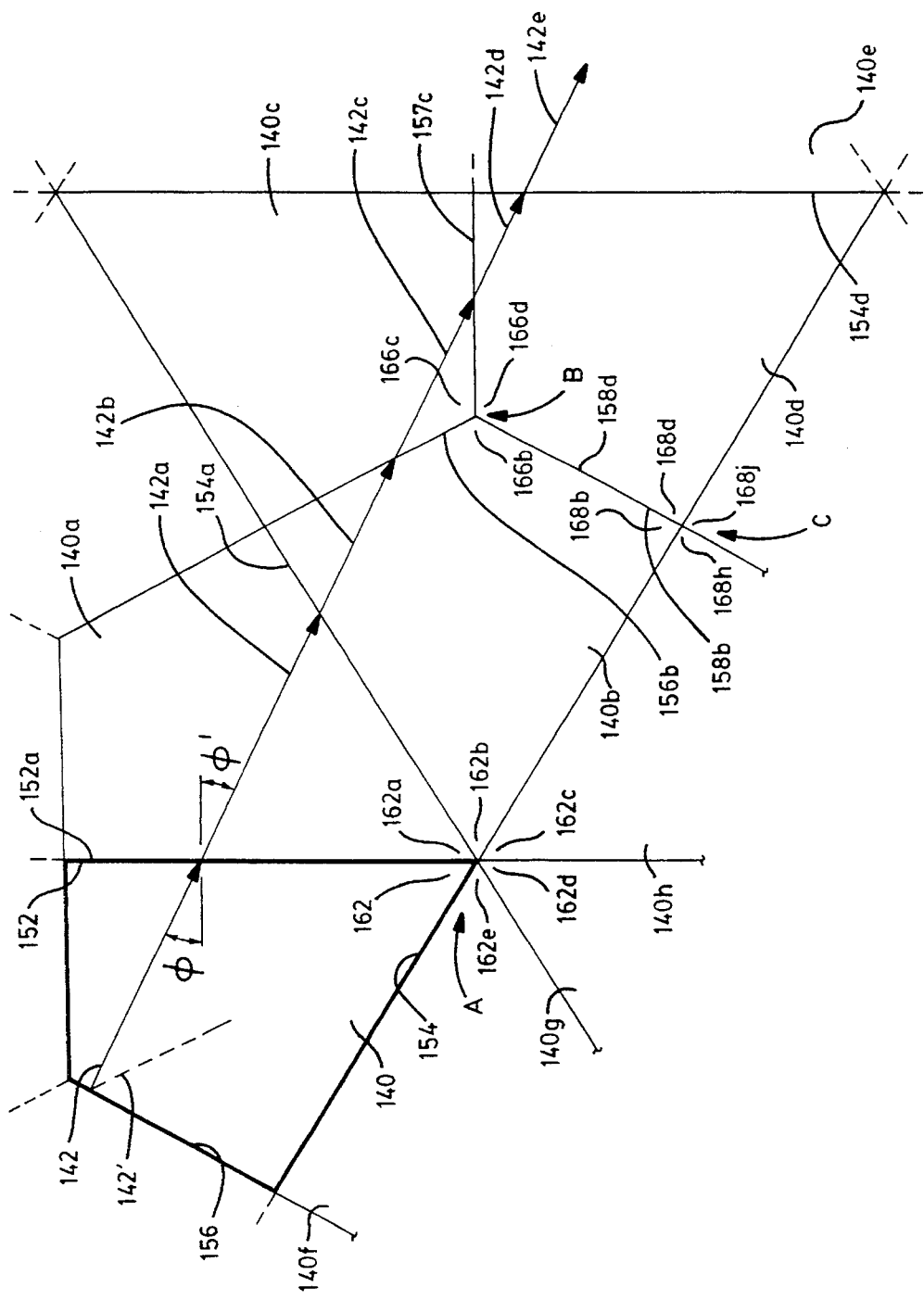
FIG. 8 is a diagram illustrating the "space-filling tiling" property required for a polygon whose shape is used in a waveguide according to the present invention.

The alternate method of representing the optical path followed by ray 142 as a straight line is shown in FIG. 8. In the example provided, ray 142 and first reflected ray segment 142a are shown as two line segments, both forming a straight line continuing across a reflecting interface depicted by side 152 and a side 152a of an adjacent virtual polygon 140a. The angle of incidence $\phi$ and the angle of reflection $\phi'$ appear on opposite sides of the reflecting interface. Polygon 140a has been constructed by a mirror reflection across side 152. The relative positions of the sides and vertices of polygon 140a are thus reversed from the positions of the corresponding sides and vertices of the original.

First reflected ray segment 142a is, in turn, incident upon side 154a. This produces a second reflected ray segment 142b which is a continuation, into a virtual polygon 140b, of the straight line formed by ray 140 and first reflected ray segment 140a. Polygon 140b has been constructed by a mirror reflection of polygon 140a across a side 154a. The sides and vertices of polygon 140b are thus reversed from those of polygon 140a and are thus symmetrical to the sides and vertices of the original. The remaining ray path, being an extension of the straight line, is comprised of third reflected ray segment 142c passing through a virtual polygon 140c, fourth reflected ray segment 142d passing through a virtual polygon 140d, and fifth reflected ray segment 142e passing into a virtual polygon 140e. This succession of virtual polygons has been constructed by a series of consecutive mirror reflections executed across reflecting interfaces defined by side 156b, side 157c, and side 154d in sequence. Note that polygon 140d can be alternatively constructed by a mirror reflection of polygon 140b across side 158b.

Each reflected ray segment, such as first reflected ray segment 142a, passing through one of the reflected polygons, such as polygon 140a, represents a reflected ray confined within the inner cladding 132 of FIG. 6. Conversely, the relative position of any reflected ray segment within inner cladding 132 (e.g., first reflected ray segment 142a) is the same as the relative position of the corresponding ray within a polygon (i.e., first reflected ray segment 142a in polygon 140a) in the polygon array of FIG. 8. As each successive ray segment is depicted passing through an adjacent polygon, with each successive passage occurring in a different location within the respective polygon, the corresponding reflected ray segment is depicted as passing through a different location within the cross section of inner cladding 132.

Because the geometry of the polygon provides for a continuous and endless array of polygons with no "gaps" or unfilled spaces between them, the optical path of the propagating ray can be extended indefinitely in all directions, producing an indefinite number of reflected ray segments. As stated above, if these reflected rays were depicted on the projection plane of FIG. 6, the projection plane would become uniformly covered by the resultant lines. The reflected ray segments, which define the path followed by the propagating ray, thus form into a uniform spatial distribution throughout the projection plane.

It should be noted that there may be certain propagating rays aligned parallel to the sides of the polygon. Such rays will produce reflected rays which "repeat" over themselves and, consequently, would not migrate across the face of the projection plane. These rays are not considered in this analysis because they represent a vanishingly small proportion of the total rays present in an optical fiber. From a realistic standpoint, diffraction and device imperfections assure that an optical ray perfectly parallel to a polygon side would not be realized in practice.

A similar depiction can be made for the optical path followed by second ray 142', propagating from side 156 and incident upon side 154. This optical path appears in the polygon but, unlike the optical path taken by ray 142, passes into a polygon 140f, into a polygon 140g, and continues into a polygon 140h. The reflections produced by second ray 142' will likewise uniformly cover the projection plane, but in a pattern different from the pattern of reflected rays obtained with the sequence of reflections produced by optical ray 142.

To summarize, multimode optical radiation, propagating within optical fiber 130 as a large number of optical rays, is induced to form an essentially uniform radiation field. This is a consequence of the property of the convex polygon used for the cross-sectional shape of inner cladding 132. When viewed as a two-dimensional projection onto a plane which includes the cross section of inner cladding 132, the spatial distribution pattern produced by the reflection segments of each optical ray is a uniform distribution.

A uniform radiation field is necessary if all the power in the propagating radiation is to be made available for absorption by the core dopant. The uniform field causes each radiation mode to periodically intersect the core and to transfer a portion of its power to the dopant. The total amount of power coupled into the core is related to the length of fiber used for the coupling process, and the concentration-length product which can be adjusted in a well-known manner so as to achieve substantially total absorption at a desired length.

Each of these spatial distribution patterns can also be represented as a straight-line optical ray extending along an endless planar array of the convex polygon used for the cross-sectional shape of inner cladding 132. For any particular propagating ray, each reflected ray segment in inner cladding 132 is equivalent to one of the ray segments appearing in one of the arrayed polygons.

When the straight-line representation of an optical ray passes through an endless series of arrayed identical polygons, the optical ray will produce a uniform spatial distribution of reflected rays within the optical fiber inner cladding. When the endless array of polygons fills, or tiles, the plane of the array, all optical ray straight-line representations will pass through an endless series of arrayed polygons. Thus, when the array of polygons tiles the plane such that no spacing is present between adjacent polygons, an inner cladding having a cross section in the shape of this polygon will produce a uniform field from the confined radiation.

Not all convex polygons have the property that a planar array of polygon mirror reflections will completely fill a plane. Non-tiling polygons will leave uncovered spaces in the plane. Not all straight lines will constantly pass through polygons. A waveguide having a cross-sectional shape of a non-tiling polygon will not induce incoming radiation to form into a uniform field. Consequently, the invention relates to a class of shapes having the needed properties which meet two criteria.

The first criterion for the preferred polygon shape is derived from a requirement that a planar array formed by repeated mirror reflections of the cross-sectional shape completely fills the plane. Fulfilling this criterion insures that successive reflections of an incident ray will be sustained to allow propagation of a ray oriented in any initial direction. This necessitates that there be no "unfilled space" between adjacent polygon shapes. A first corollary to the first criterion is that any shape having a curved side or a convex vertex angle is eliminated from consideration. Accordingly, the required cross-sectional shape is a convex polygon having three or more sides.

A second corollary is that each vertex angle must be an integral divisor of 360°. This can be explained by first noting that adjacent polygons share a common point. For example, vertices 162, 162a, 162b, 162h, 162g, and 162f all meet at a common point, denoted by 'A', in the polygon array of FIG. 8. Similarly, vertices 166b, 166c, and 166d all meet at a common point 'B' and vertices 168b, 168d, 168j, and 168h all meet at common point 'C' in the array. Further, each vertex angle at a common point is equal to each other vertex angle at the same common point. The sum of the vertex angles at any common point, therefore, must equal 360° if there is to be no unfilled space between polygons. It follows then that the vertex angles must be integral divisors of 360°. By inspection, each of the six vertex angles at common point A must equal 60°, each of the three vertex angles at common point B must equal 120°, and each of the four vertex angles at a common point C must equal 90°.

The second criterion arises from a further inspection of the common points where three or more vertices are found. The polygons surrounding a common point can be viewed as having been generated by a series of multiple reflections beginning with an initial polygon and using the common point as a center of rotation for the series of reflections. For example, two of the three polygons surrounding common point B can be viewed as having been generated from polygon 140b by a first mirror reflection across side 156b to produce polygon 140c, and a second mirror reflection across side 157c to produce polygon 140d. A third mirror reflection, across side 158d, will yield the original polygon 140b. That is, three reflections of initial polygon 140b around common point B maps the initial polygon 140b onto itself. Further, the number of reflections required to perform this mapping is equal to the number of vertex angles surrounding the common point. In the example given, three reflections are required because 360° divided by vertex angle 120° equals three. Thus, the second criterion for a polygon shape requires that the polygon is mapped onto itself when a series of $k_j$ mirror reflections is performed about a vertex, where the vertex angle is equal to 360° divided by $k_j$.

Figure 9:
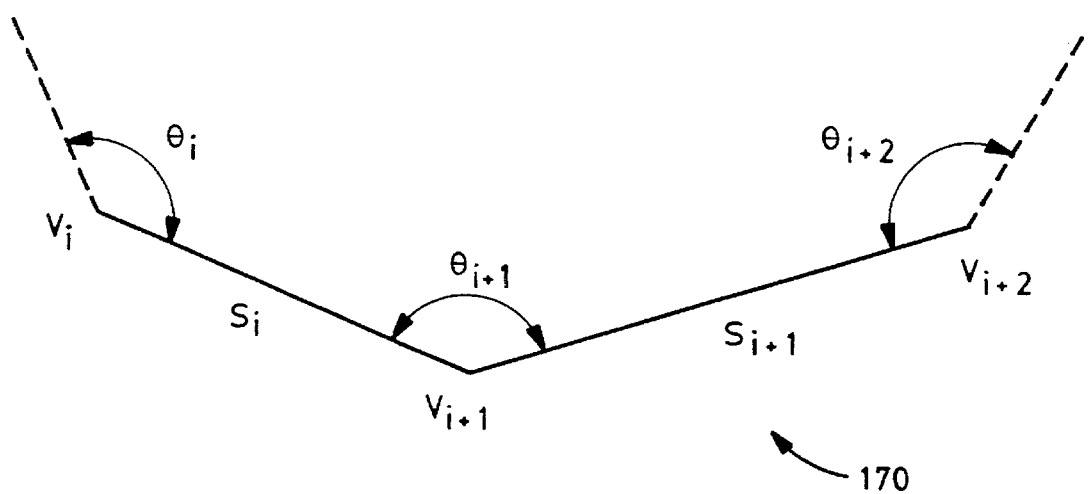
FIG. 9 is a portion of a general polygon development.

The two criteria discussed above can be more generally stated with reference to the diagram of FIG. 9 in which is shown an N-sided convex polygon 170. Polygon 170 has sides $s_i$ and vertices $V_i$ where $1 \leq i \leq N$. Further, vertex $V_{i+1}$ is formed by sides $s_i$ and $s_{i+1}$. By inspection, it can be seen that, because polygon 170 is closed, vertex $V_1$ is formed by side $S_N$ and side $s_1$. According to the first criterion discussed above, the vertex angle $\theta_i$ of each vertex $V_i$ of N-sided convex polygon 170 must satisfy the condition that $\theta_i = 360°/k_i$, where $k_i \geq 3$.

The vertex angles which meet the above condition are integral divisors of 360°, e.g., 120°, 90°, 72°, 60°, 45°.

According to the second criterion, N-sided convex polygon 170 further has the property that it is mapped onto itself when a series of $k_j$ reflections is executed about any vertex $V_j$. This series of reflections would include a first reflection across side $S_j$, a second reflection across side $s_{j+1}$, a third reflection across side $s_j$, and subsequent reflections performed alternatingly across sides $s_{j+1}$ and $s_j$ until the series of $k_j$ reflections has been accomplished.

In summary, the invention relates to a class of waveguides having the cross-sectional shape of a convex polygon which meets the requirements that, if a number of such polygons is used to tesselate, or tile, a plane, all of the polygons will fill the available space and fit without overlapping or leaving an intervening space between adjacent polygons, and all of the polygons will be mirror images of one another about any common side.

Fabrication of an optical cable in accordance with the invention is accomplished by machining a preform to the desired cross section and then drawing the preform in the method known to those in the art.

The above two criteria can be shown to be satisfied by at least eight different convex polygon shapes.

Figure 10A:
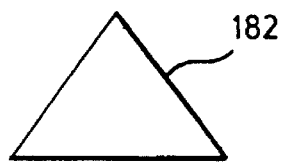
FIGS. 10A through 10D are diagrams of optical fiber embodiments for a waveguide cross section of three sides according to the present invention.
Figure 10B:
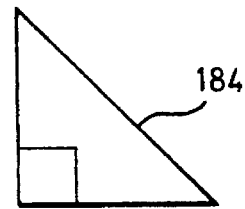
Figure 10C:
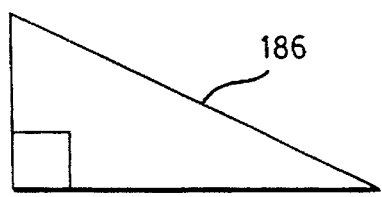
Figure 10D:
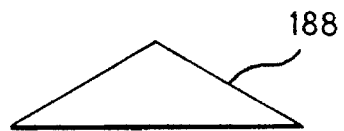

The preferred embodiments for an inner cladding in a double-clad fiber structure according to the present invention have cross sections in the shape of a polygon with three, four, or six sides. For example, the embodiments having cross sections in the shape of a three-sided polygon include an equilateral triangle 182, as shown in FIG. 10A, a right-isosceles triangle 184 as in FIG. 10B, a 30°-60°-90° triangle 186 as shown in FIG. 10C, a and a 30°-30°-120° triangle 188 as shown in FIG. 10D.

Figure 11A:
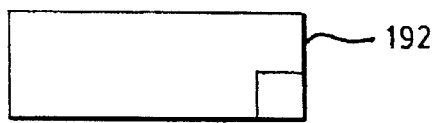
FIGS. 11A through 11D are diagrams of optical fiber embodiments for a waveguide cross section of four sides according to the present invention.
Figure 11B:
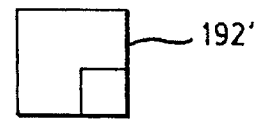
Figure 11C:
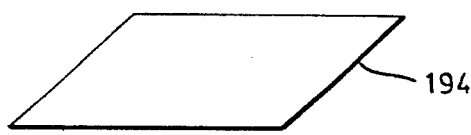
Figure 11D:
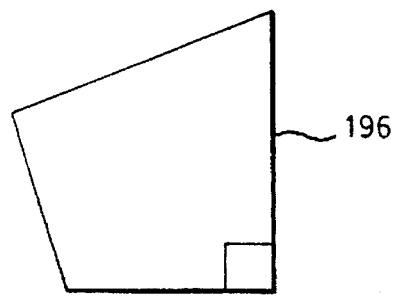
Figure 12:
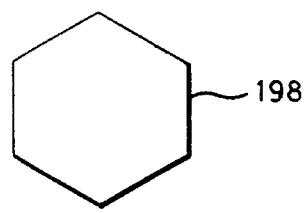
FIG. 12 is a diagram of an optical fiber embodiment for a waveguide cross section of six sides according to the present invention.

The embodiments having cross sections in the shape of a four-sided polygon include a rectangle 192 as shown in FIG. 11A, a square 192' as shown in Fig 11B, a 60° rhombus 194 as shown in FIG. 11C, and a symmetrical quadrangle 196 having opposed vertex angles of 60° and 120° as shown in FIG. 11D. An embodiment having a cross section in the shape of a six-sided polygon is that of a regular hexagon 198 as shown in FIG. 12. Even though rectangle 192 meets the criteria found to be inventive here, it is specifically not considered part of the claimed invention.

The particular cross section selected for a particular application will depend upon a number of considerations, including the physical attributes of the waveguide having the particular cross section selected and the nature of the radiation pattern from the pump source. A waveguide having the cross section of rectangle 192, for example, may be the most flexible in one direction. A waveguide having the cross section of square 192' may be easier to fabricate than a waveguide having the cross section of hexagon 198, but less material is removed from a round preform to form hexagon 198 than to form square 192'. For other applications in which a particular waveguide stacking arrangement is required, a waveguide having a triangular cross section may be optimal.

Figure 13:
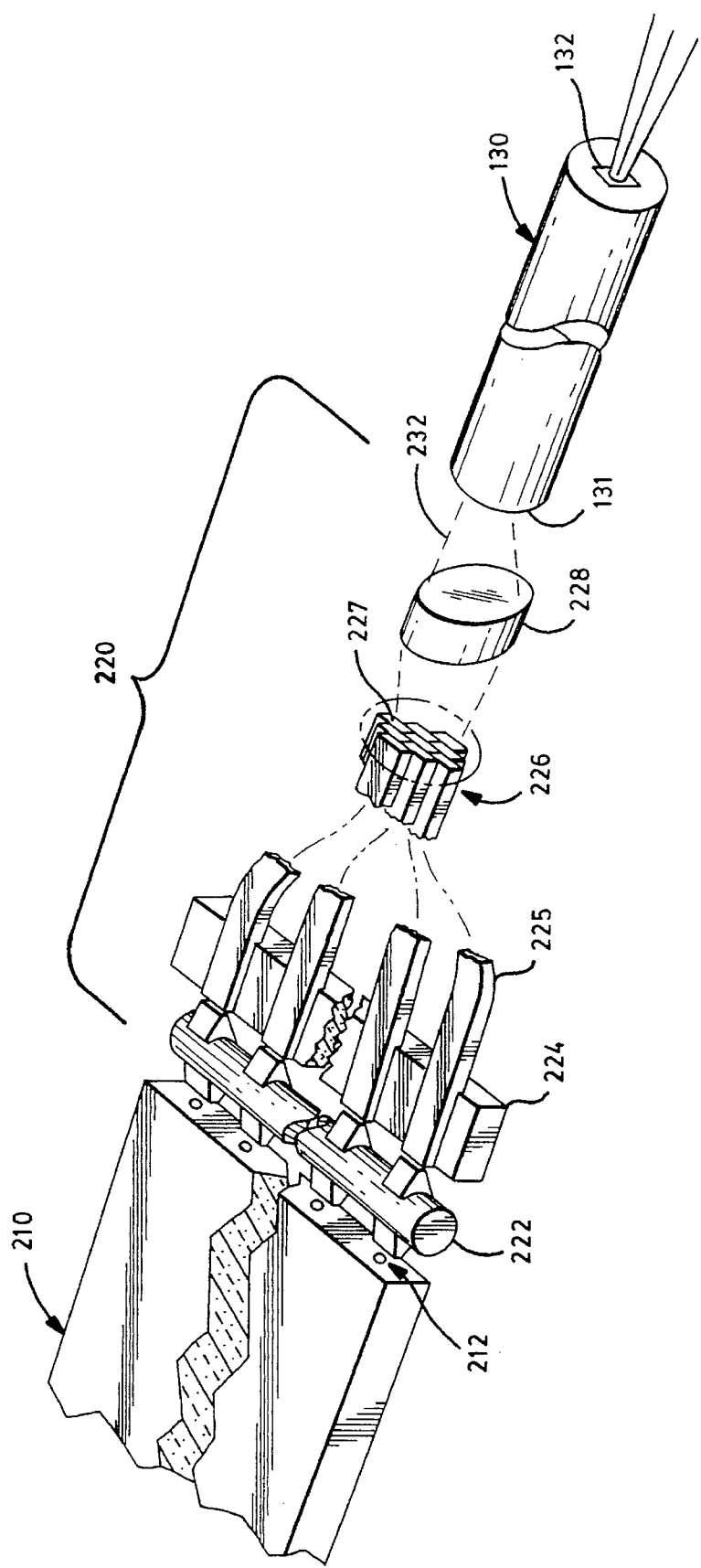
FIG. 13 is a diagrammatic perspective view of a typical application for an optical fiber according to the present invention, showing a laser bar, an optical beam rotating device, focusing optics, and the optical fiber.

In a typical application a laser diode array 210 may be used to provide pump power to optical fiber 130 as shown in FIG. 13. The output of laser diode array 210 is typically converted by means of an intermediate optical system 220 from an array of individual laser beams 212 into a single output beam 232. Optical system 220 may be an optical fiber laser and geometric coupler as disclosed in U.S. Pat. No. 5,268,978 issued to Po et al. Optical system 220 is designed to yield a numerical aperture for single output beam 232 which is compatible with the numerical aperture of inner cladding 132 as seen at an input end 131 of optical fiber 130.

Optical system 220 includes a beam collimator 222, for reducing the growth of beams 212 in one azimuth. After collimation, laser beams 212 pass into a plurality of waveguides 225. Each waveguide 225 is positioned proximate a corresponding laser beam 212 as it emerges from beam collimator 222 by means of an alignment block 224. The output ends 227 of the waveguides 225 merge into a stack 226 configured to provide a particular beam geometry. A reduction lens 228, which can be a singlet or more complex multi-element form, images waveguide stack 226 to a size equal to, or slightly smaller than, the cross-sectional shape of inner cladding 132. In the example shown, the beam output of waveguide stack 226 is circular in shape. Consequently, the preferred shape for the cross section of inner cladding 132 is that of a square.

While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. An optical fiber structure for use in gain applications, said structure comprising:

at least one core selectively doped with an active gain species; and an art inner cladding surrounding said core for purposes of receiving pump energy and transferring the pump energy to said core as the pump energy propagates along the length of said inner cladding, said inner cladding having a cross-sectional shape in the form of a non-rectangular, convex polygon, said polygon having the property that, if a plurality of said polygons are used to tile a plane, all of said polygons will fit into the tiling such that no spacing will be present between adjacent polygons and, further, such that all said polygons will be mirror images of one another about any common side.

2. The optical fiber structure of claim 1 wherein said core comprises a single-mode core.

3. The optical fiber structure of claim 1 wherein said core comprises up to 0.5 weight-percent of a rare-earth dopant.

4. The optical fiber structure of claim 1 wherein a first vertex angle of said polygon is an integral divisor of 360°.

5. The optical fiber structure of claim 4 wherein said first vertex angle is approximately 120 degrees.

6. The optical fiber structure of claim 5 wherein a second vertex angle of said polygon is approximately 120 degrees.

7. The optical fiber structure of claim 6 wherein said polygon comprises a regular hexagon.

8. The optical fiber structure of claim 5 wherein a second vertex angle of said polygon is approximately 60 degrees.

9. The optical fiber structure of claim 8 wherein said polygon comprises a rhombus.

10. The optical fiber structure of claim 8 wherein said polygon comprises a symmetrical quadrangle.

11. The optical fiber structure of claim 4 wherein said first vertex angle is approximately 90 degrees.

12. The optical fiber structure of claim 11 wherein a second vertex angle of said polygon is approximately 90 degrees.

13. The optical fiber structure of claim 11 wherein a second vertex angle of said polygon is approximately 60 degrees.

14. The optical fiber structure of claim 13 wherein said polygon comprises a triangle.

15. The optical fiber structure of claim 4 wherein said first vertex angle is approximately 60 degrees.

16. The optical fiber structure of claim 15 wherein a second vertex angle of said polygon is approximately 60 degrees.

17. The optical fiber structure of claim 16 wherein said polygon comprises a triangle.

18. The optical fiber structure of claim 4 wherein said first vertex angle is approximately 45 degrees.

19. The optical fiber structure of claim 18 wherein a second vertex angle of said polygon is approximately 90 degrees.

20. The optical fiber structure of claim 19 wherein said polygon comprises a triangle.

21. The optical fiber structure of claim 4 wherein said first vertex angle is approximately 30 degrees.

22. The optical fiber structure of claim 21 wherein a second vertex angle of said polygon is approximately 30 degrees.

23. The optical fiber structure of claim 22 wherein said polygon comprises a triangle, 24. The optical fiber structure of claim 1 wherein the concentration-length product of said core is adjusted so that there is realized a net gain along said core with respect to the coupling efficiency of the optical fiber structure.

25. The optical fiber structure of claim 1 further comprising an outer cladding, said outer cladding surrounding said inner cladding.

26. The optical fiber structure of claim 25 wherein said outer cladding comprises a low-index fluorinated polymer.

27. The optical fiber structure of claim 25 wherein the index of refraction of said inner cladding is larger than the index of refraction of said outer cladding, such that the numerical aperture of the receiving face of said inner cladding is approximately 0.4.

28. An optical gain system, comprising
a pump source;
an optical fiber structure, said structure comprising:
   a core selectively doped with an active gain species; and
   an inner cladding surrounding said core for purposes of receiving pump energy and transferring the pump energy to said core as the pump energy propagates along the length of said inner cladding, said inner cladding having a cross-sectional shape in the form of a non-rectangular, convex polygon, said polygon having the property that, if a plurality of said polygons are used to tile a plane, all of said polygons will fit into the tiling such that no spacing will be present between adjacent polygons and, further, such that all said polygons will be mirror images of one another about any common side; and
means for imaging pump source radiation onto said inner cladding, said means for imaging being intermediate between said optical fiber structure and said pump source, for converging the radiation produced by said pump source such that the numerical aperture of the radiation closely matches the optical characteristics of said optical fiber structure.

29. An optical gain system, comprising
a laser diode array;
an optical fiber structure, said structure comprising:
   a core selectively doped with an active gain species; and
   an inner cladding surrounding said core for purposes of receiving pump energy and transferring the pump energy to said core as the pump energy propagates along the length of said inner cladding, said inner cladding having a cross-sectional shape in the form of a non-rectangular, convex polygon, said polygon having the property that, if a plurality of said polygons are used to tile a plane, all of said polygons will fit into the tiling such that no spacing will be present between adjacent polygons and, further, such that all said polygons will be mirror images of one another about any common side;
optical coupling means, intermediate between said optical fiber structure and said laser diode array, for transforming the output of said laser diode array into a combined radiation output; and
means for imaging said combined radiation output onto said inner cladding, intermediate between said optical fiber structure and said laser diode array, for converging said combined radiation such that the numerical aperture of said combined radiation output closely matches the optical characteristics of said optical fiber structure.

30. An optical fiber structure for use in gain applications, said structure comprising:
at least one core selectively doped with an active gain species; and
an inner cladding surrounding said core for purposes of receiving pump energy and transferring the pump energy to said core as the pump energy propagates along the length of said inner cladding, said inner cladding having a cross-sectional shape in the form of a square.

31. An optical gain system, comprising:
a pump source;
an optical fiber structure, said structure comprising:
  a core selectively doped with an active gain species; and
  an inner cladding surrounding said core for purposes of receiving pump energy and transferring the pump energy to said core as the pump energy propagates along the length of said inner cladding, said inner cladding having a cross-sectional shape in the form of a square; and
means for imaging pump source radiation onto said inner cladding, said means for imaging being intermediate between said optical fiber structure and said pump source, for converging the radiation produced by said pump source such that the numerical aperture of the radiation closely matches the optical characteristics of said optical fiber structure.

32. An optical gain system, comprising:
a laser diode array;
an optical fiber structure, said structure comprising:
  a core selectively doped with an active gain species; and
  an inner cladding surrounding said core for purposes of receiving pump energy and transferring the pump energy to said core as the pump energy propagates along the length of said inner cladding, said inner cladding having a cross-sectional shape in the form of a square;
optical coupling means, intermediate between said optical fiber structure and said laser diode array, for transforming the output of said laser diode array into a combined radiation output; and
means for imaging said combined radiation output onto said inner cladding, intermediate between said optical fiber structure and said laser diode array, for converging said combined radiation such that the numerical aperture of said combined radiation output closely matches the optical characteristics of said optical fiber structure.

* * * * *